A. H. NELLER & A. F. LAGEMANN.
ROLLER RAISING AND LOWERING DEVICE.
APPLICATION FILED AUG. 15, 1912.
1,123,199.
Patented Dec. 29, 1914.
4 SHEETS—SHEET 1.
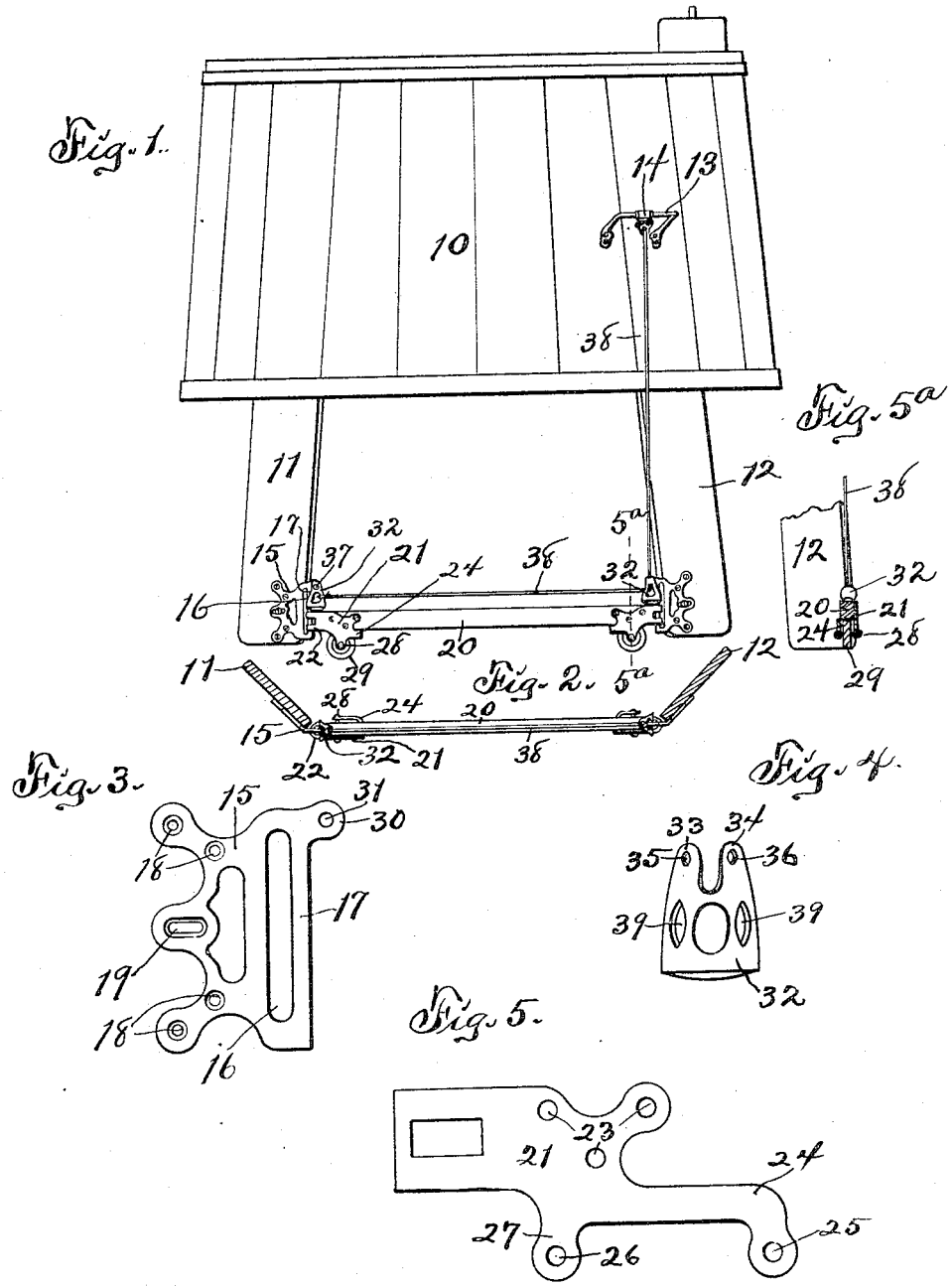

A. H. NELLER & A. F. LAGEMANN.
ROLLER RAISING AND LOWERING DEVICE.
APPLICATION FILED AUG. 15, 1912.
1,123,199.
Patented Dec. 29, 1914.
4 SHEETS—SHEET 2.
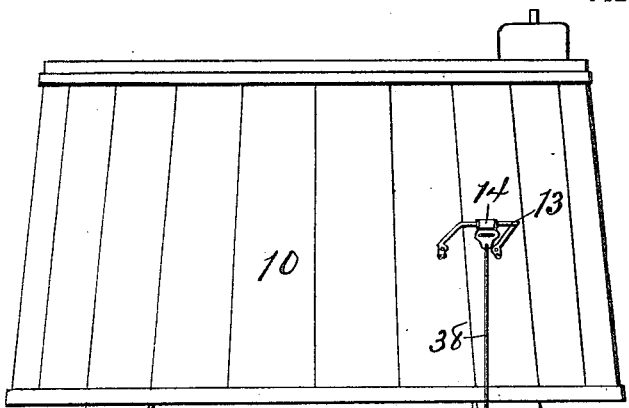
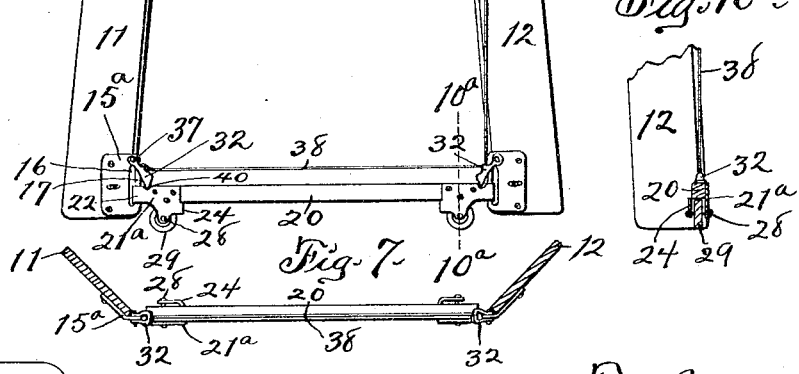
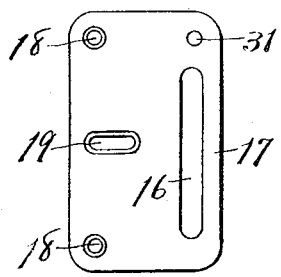
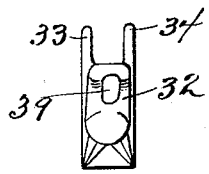
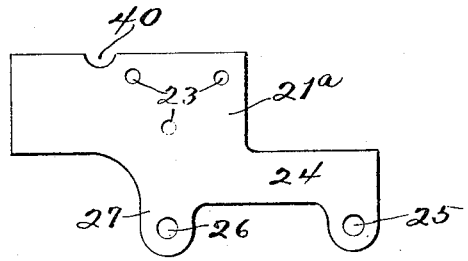

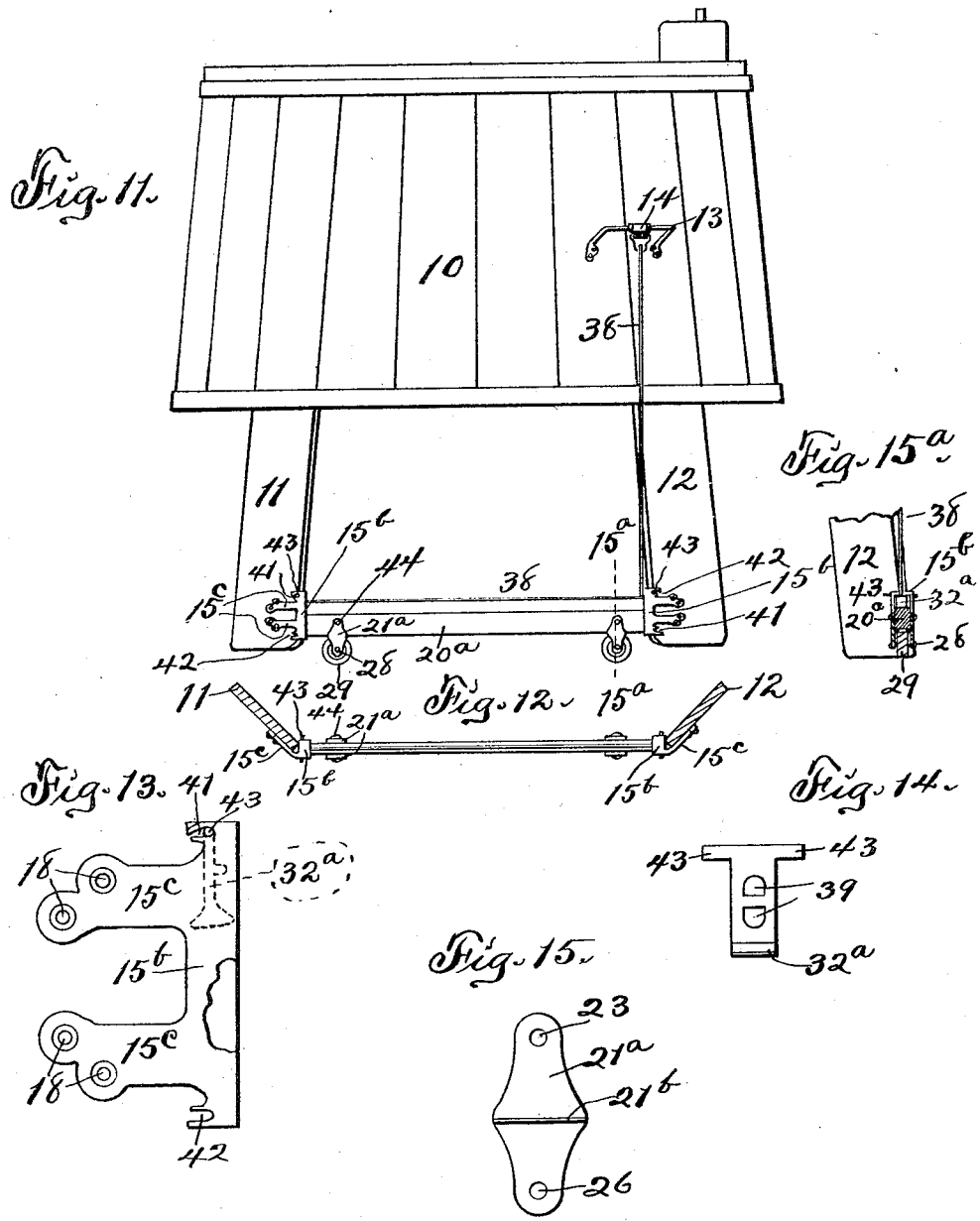

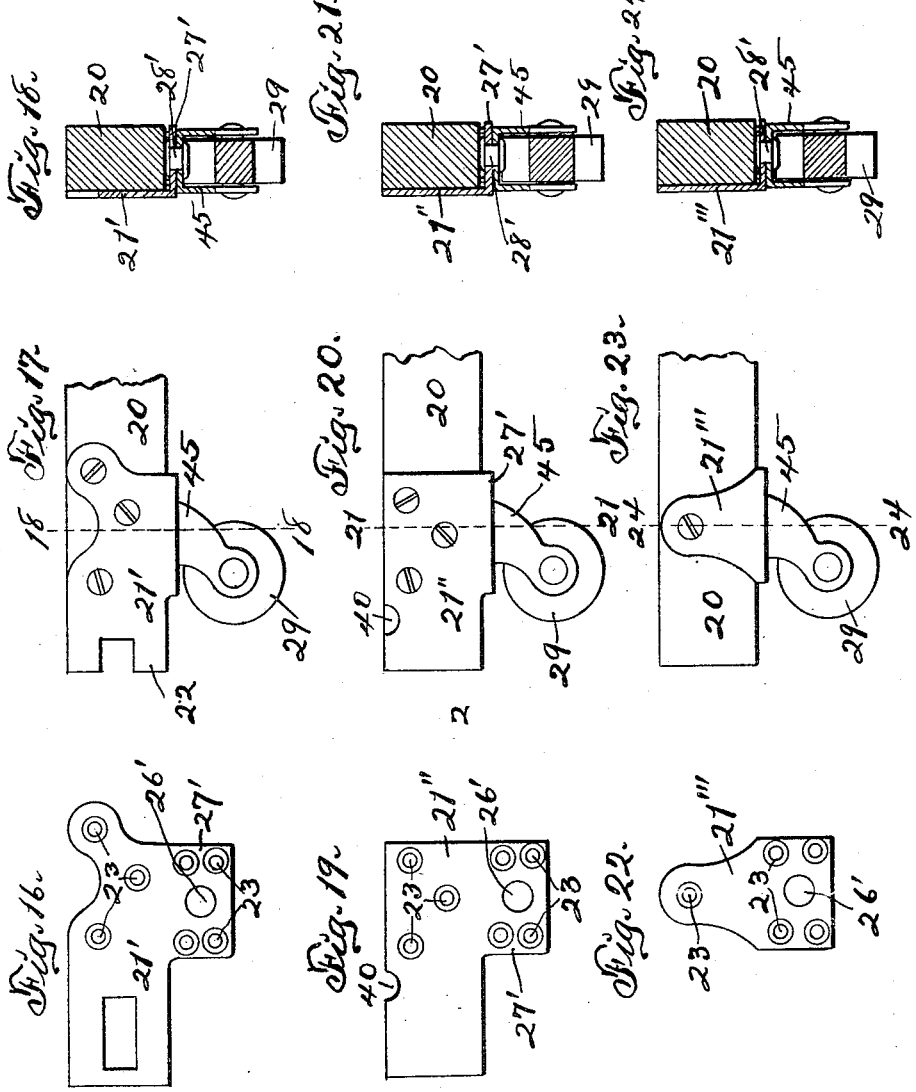

UNITED STATES PATENT OFFICE.

ALBERT H. NELLER, OF FAIRFIELD, IOWA, AND ARTHUR F. LAGEMANN, OF QUINCY, ILLINOIS.

ROLLER RAISING AND LOWERING DEVICE.

1,123,199.  Specification of Letters Patent.  Patented Dec. 29, 1914.

Application filed August 15, 1912. Serial No. 715,269.

*To all whom it may concern:*

Be it known that we, ALBERT H. NELLER and ARTHUR F. LAGEMANN, citizens of the United States of America, and residents of Fairfield, Jefferson county, Iowa, and Quincy, Adams county, Illinois, respectively, have invented a new and useful Roller Raising and Lowering Device, of which the following is a specification.

The object of this invention is to provide means for disconnecting rollers relative to a device supported thereby for the purpose of rendering stationary and stable said device.

A further object of this invention is to provide means for manually applying and removing roller supports from a device for the purpose of transforming said device from roller portable to stationary condition.

A further object of this invention is to provide roller supporting means and connections between said means and a device to be supported thereby, which connections are susceptible of movement through an arc for disconnecting of the supporting means from the device.

A further object of this invention is to provide improved means for slidingly connecting a roller support to a device to be supported thereby and movable connections between said support and device adapted to fix and determine the relation of the support to the device.

A further object of this invention is to provide a bar formed with a roller support at each end, a supporting bracket, and detachable connections between said device and bracket whereby the supporting device may be fixed in a given relation to the bracket.

Our invention consists in the construction, arrangement and combination of elements hereinafter set forth, pointed out in our claims and illustrated by the accompanying drawing in which—

Figure 1 is an elevation showing our improved device applied to a washing machine and arranged for roller support of said machine and adapted for portability thereof. Fig. 2 is a horizontal section through one pair of the legs of the washing machine, showing our device applied thereto. Fig. 3 is a plan of a blank bracket employed in the device. Fig. 4 is a plan of a blank of a detent employed in the device. Fig. 5 is a plan of a blank of a roller bracket employed in the device. Figs. 5$^a$, 10$^a$, 15$^a$ are cross-sections on the indicated lines. Figs. 6, 7, 8, 9 and 10 are views corresponding in character to Figs. 1 to 5 inclusive and illustrating a modified form of our improved device. Figs. 11, 12, 13, 14 and 15 are views corresponding in character with Figs. 1 to 5 inclusive and illustrating a further modified form of our improved device. Figs. 16 to 24 are views of modified constructions showing casters.

In the construction of the device as shown in Figs. 1 to 5$^a$ the numeral 10 designates a device to be supported, such as the tub of a washing machine, which is formed with legs 11, 12 and other legs corresponding thereto and not shown, of common form. The tub 10 also is formed with an outstanding handle 13 on which is pivoted a depending clip 14, said handle and another corresponding thereto on the opposite side of the tub being adapted for use in lifting or moving the tub laterally. Brackets 15, preferably four in number of which two are shown in Figs. 1 and 2, are mounted on the lower end portions and outer faces of the legs 11, 12 and also on the other legs which are not shown, there being one bracket for each leg. The brackets 15 may be of any desired form, size or material but preferably have the characteristic of a vertical slot 16 and a guide bar 17 parallel with said slot and at one margin of the bracket. Any desired means may be employed for securing the bracket to the device to be supported, and for this purpose screw holes 18 are shown conventionally. For convenience in adjusting the bracket laterally on the device to be supported preparatory to permanent fastening of the bracket, a horizontal slot 19 is shown as a substitute for a screw hole. The roller supporting device preferably is composed of a bar 20 and a roller bracket 21 at each end of the bar. The roller brackets 21 as well as the clips 15 preferably are made in right and left form. The brackets 15 may be bent on a line or lines parallel to the slot 16 and guide bar 17 for convenience in adjusting them to devices to be supported, such as legs 11, 12 which may stand at varying angles to a line intersecting outermost corners of said devices, in order that the guide bars may be directly opposite each other and not stand out materially from a plane common to the devices to be supported. Each roller bracket 21 preferably is formed of a single piece of metal susceptible of being bent intermediate of its ends, such as stamped steel, white metal or malleable iron, and may be of any desired form or size but preferably has the characteristics of a loop or U-shaped bend or hook 22 adapted to embrace and slidingly engage the guide bar 17. Any desired means may be employed for securing the roller brackets to the bar 20 and for this purpose bolt holes 23 are shown conventionally. The bracket 21 preferably is formed with an arm 24 adapted to be bent into U shape (Fig. 2) and extended beneath the bar 20. A hole 25 is formed in the extremity of the arm 24 and when said arm is bent said hole registers with a hole 26 in a downwardly extending ear 27 on the body of the bracket and is adapted to receive a pin or axle 28 on which a roller 29 is pivoted. The bar 20 may be of any desired length but preferably contains the characteristics of means for connecting, spacing apart and properly holding the brackets 21. An ear 30 is formed on and extends laterally from each of the brackets 15 at the upper end of the guide bar 17 and each ear is formed with a hole 31. A pawl or detent 32 is provided and preferably is formed of material susceptible of being bent, such as stamped steel, white metal or malleable iron. The detent 32 preferably has the characteristics of spaced arms 33, 34 formed with holes 35, 36 and said arms are adapted to be bent into parallel planes and receive a pin 37 through the holes 35, 36 and through the hole 31 for the purpose of pivoting said detent to the ear 30. The closed base or the lower end portion of the detent 32 is adapted to contact with the upper surface of the looped or hooked end portion 22 of the roller bracket 21 for the purpose of preventing upward movement of the roller bracket along the guide bar 17. When the parts are assembled as shown with the pawls or detents 32 in depending positions, the rollers 29 rest on the floor or other supporting surface and support the brackets 15 and legs carried thereby clear of said surface, thus providing a roller support on which the tub 10 may be moved from place to place conveniently. A draft device, such as a cord 38, is fixed at one end to one of the pawls 32, extends through holes 39 in the other pawl 32, and thence extends upwardly and is fixed to the depending clip 14 on the handle 13. The cord 38 preferably is relatively taut. When it is desired to lower the supported device, such as the tub 10, and suspend for the time being the portable character thereof through the roller supporting device, lifting strain is applied to the handle 13 and at the same time the depending bracket 14 is moved inwardly through an arc by the same hand which does the lifting, thus applying draft through the cord 38 sufficient to lift the pawls 32 through arcs and disengage them from the roller brackets 21. This done, and while the strain is continued on the cord 38, the device 10 is lowered until the legs 11, 12 rest directly on the supporting surface. It is to be understood that one or both sides of the tub may be manipulated for suspending of the roller support and that this may be done separately or conjunctively.

In the construction of the device as shown in Figs. 6 to 10$^a$ inclusive the bracket 15$^a$ preferably is formed of sheet metal by stamping and the ear 30 is omitted, a pin hole 31 being formed directly in the body of the bracket above the slot 16. In this structure a pawl 32 is pivoted on a pin 37 in the hole 31 and engages at times in a notch 40 in a bracket 21$^a$. In this construction the bracket 21$^a$ preferably is formed of sheet metal by stamping; in all other respects the structure defined in Figs. 6 to 10 inclusive and the operation thereof is the same as that described in connection with Figs. 1 to 5 inclusive.

In the construction of the device as illustrated in Figs. 11 to 15$^a$ inclusive the bracket 15$^b$ preferably is rectangular and of looped form and is provided with arms 15$^c$ having screw holes 18 to secure the bracket to a device to be supported. The bracket 15$^b$ is formed with lateral notches 41, 42 alike in size, construction and relative location, and said notches are adapted to receive, selectively, pintles 43 on a pawl 32$^a$. The uppermost notch only is occupied by the pintles of the pawl and when the bracket 15$^b$ is inserted for opposite location (Figs. 11, 12) the opposite notches are employed. In this construction end portions of the bar 20$^a$ are received directly and slidingly in the loops of the brackets 15$^b$ and are held in given positions by the pawls 32$^a$ when said pawls are in depending positions as shown by dotted lines in Fig. 13. The bar 20$^a$ preferably is supported by roller brackets 21$^a$ arranged in pairs. Each roller bracket 21$^a$ is formed with an inwardly extending centrally located flange 21$^b$ adapted to extend inwardly partly across and engage the lower margin of the bar 20$^a$. The roller brackets 21$^a$ are formed with holes 26 in their lower ends adapted to receive a pin 28 on which a roller 29 is pivoted. The device constructed according to Figs. 11 to 15 is operated in the same manner as is above described in connection with the device illustrated in Figs. 1 to 5 inclusive.

In Figs. 16 to 24 inclusive provision is made for employing caster in the roller supporting brackets. In Figs. 16, 17, 18 a bracket 21' is formed with a lateral ear 27' adapted to be bent at right angles to the body, the bracket and ear being formed with holes 23 to receive screws or bolts for securing to the bar 20. The ear 27' extends across beneath the bar 20 and is formed with a central hole 26' adapted to receive and pivotally support a caster stem or rivet 28', which stem or rivet also extends through the center of a caster yoke 45 carrying the usual roller or wheel 29. The bracket 21' also is bent to form a hook 22. In Figs. 19, 20 and 21 a bracket 21'' is formed with a lateral ear 27' adapted to be bent and carry a caster, and also is formed with a notch 40 to receive a pawl or detent as in Fig. 6. In Figs. 22, 23, 24, a bracket 21''' is formed and adapted to be bent laterally between its ends and be fixed to the bar 20. The laterally bent end portion of the bracket 21''' extends across beneath the bar 20 and carries a caster in the same manner as the bracket 21'.

It is to be understood that this invention encompasses the selective use of plain rollers or wheels or caster wheels of whatever form in respect of swiveling thereof.

We claim as our invention—

1. In combination, a supported body, a supporting body, rollers mounted rotatably on the under side of the supporting body, spaced detents pivotally mounted on the supported body adjacent to the supporting body, a handle pivotally mounted on the supported body, and operative connections between said handle and said detents adapted, when said handle is swung upwardly, to swing said detents into pushing engagement with said supporting body to shift the latter downwardly placing said rollers below the supported body.

2. In combination, a supported body, a supporting body movable relative to said supported body, roller mountings fixed on said supporting body, rollers in said mountings located below the under side of the supporting body, guide-bars bracketed on said supported body, said roller-mountings having integral hooks mounted slidably upon the said guide-bars, detents pivotally mounted on said supported body adjacent to said supporting body, a handle pivotally mounted upon said supported body, and connecting-means between said handle and said detents, adapted when swung upwardly, to push said detents against said supporting-body to lift the supported body above the level of said rollers.

Signed by us at Fairfield, Iowa.
ALBERT H. NELLER.
ARTHUR F. LAGEMANN.

Witnesses as to Neller:
C. C. LANAN,
I. G. BARWIS.

Witnesses to signature of Arthur F. Lagemann:
GEORGE J. GARRELTS,
MARY GARRELTS.

Copies of this patent may be obtained for five cents each, by addressing the "Commissioner of Patents, Washington, D. C."